(12) United States Patent
Yamamoto et al.

(10) Patent No.: US 10,088,997 B2
(45) Date of Patent: Oct. 2, 2018

(54) APPARATUS FOR GENERATING DATA, METHOD FOR GENERATING DATA, AND NON-TRANSITORY COMPUTER-READABLE MEDIUM

(71) Applicants: Hiroki Yamamoto, Tokyo (JP); Masahide Horiuchi, Tokyo (JP); Fumiko Tsuwano, Tokyo (JP)

(72) Inventors: Hiroki Yamamoto, Tokyo (JP); Masahide Horiuchi, Tokyo (JP); Fumiko Tsuwano, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 436 days.

(21) Appl. No.: 14/739,325

(22) Filed: Jun. 15, 2015

(65) Prior Publication Data

US 2015/0371101 A1    Dec. 24, 2015

(30) Foreign Application Priority Data

Jun. 20, 2014   (JP) ................. 2014-127626

(51) Int. Cl.
*G06F 3/048*       (2013.01)
*G06F 3/0484*      (2013.01)
*G06F 3/0481*      (2013.01)
*G06T 11/60*       (2006.01)
*G06T 7/12*        (2017.01)

(52) U.S. Cl.
CPC ........ *G06F 3/04847* (2013.01); *G06F 3/0481* (2013.01); *G06F 3/04842* (2013.01); *G06T 7/12* (2017.01); *G06T 11/60* (2013.01)

(58) Field of Classification Search
CPC ............ G06K 9/2081; G06K 15/1882; G06K 15/1868; G06K 15/14; G06K 9/4604; G06F 3/0481; G06F 3/04842; G06F 3/04847

See application file for complete search history.

(56) References Cited

U.S. PATENT DOCUMENTS 5,617,487 A * 4/1997 Yoneyama ............. H04N 1/387
                                                      382/199
6,987,535 B1 * 1/2006 Matsugu ............. G06F 3/04845
                                                      348/239

(Continued)

FOREIGN PATENT DOCUMENTS

JP      2006-133941      5/2006
JP      2006-208339      8/2006

(Continued)

*Primary Examiner* — William Bashore
*Assistant Examiner* — Gregory A Distefano
(74) *Attorney, Agent, or Firm* — Cooper & Dunham LLP

(57) ABSTRACT

An apparatus for generating data includes a display unit that displays an area object the contour of which is extracted from an image to be processed by an image processing application, an operating unit that receives selection conditions for selecting an area object that is intended by a user out of the area objects displayed by the display unit, and a contour extracting unit that extracts a contour of an area object selected based on the selection conditions received by the operating unit. When the contour extracting unit extracts a contour of a selected area object, the display unit displays the selected area object and an unselected area object in a distinguishable manner.

8 Claims, 13 Drawing Sheets

(56) References Cited

U.S. PATENT DOCUMENTS

| | | | |
|---|---|---|---|
| 2004/0213445 A1* | 10/2004 | Lee | G01S 7/52068 382/128 |
| 2010/0166256 A1* | 7/2010 | Kmiecik | G01C 11/06 382/103 |
| 2010/0220929 A1* | 9/2010 | Misawa | G06F 17/30253 382/190 |
| 2012/0299819 A1* | 11/2012 | Iseri | G01S 7/06 345/156 |
| 2015/0131127 A1 | 5/2015 | Yamamoto et al. | |

FOREIGN PATENT DOCUMENTS

| | | |
|---|---|---|
| JP | 2013-191036 | 9/2013 |
| JP | 2015-195691 A | 5/2015 |

* cited by examiner (a) PROCESSING RANGE  (b)  (c)

(a)　　　　　　　　　　(b)

(a) PROCESSING RANGE  (b)

FIG.18

| OBJECT (AREA) | POSITION OF OBJECT (h COORDINATE) | POSITION OF OBJECT (v COORDINATE) | LENGTH OF PERIPHERY | AREA | WITHIN/OUT OF OBJECT TO BE DETECTED |
|---|---|---|---|---|---|
| A | 10 | 2 | 20 | 6 | WITHIN OBJECT |
| B | 12 | 18 | 16 | 4 | OUT OF OBJECT |
| C | 23 | 12 | 32 | 9 | WITHIN OBJECT |
| D | 27 | 6 | 5 | 2 | OUT OF OBJECT |
| ... | ... | ... | ... | ... | ... |

APPARATUS FOR GENERATING DATA, METHOD FOR GENERATING DATA, AND NON-TRANSITORY COMPUTER-READABLE MEDIUM

CROSS-REFERENCE TO RELATED APPLICATIONS

The present application claims priority to and incorporates by reference the entire contents of Japanese Patent Application No. 2014-127626 filed in Japan on Jun. 20, 2014.

BACKGROUND OF THE INVENTION

1. Field of the Invention

The present invention relates to an apparatus for generating data, a method for generating data, and a non-transitory computer-readable medium.

2. Description of the Related Art

Much focus has been placed on an image forming technique with a clear toner for making image quality in an electrophotographic technique close to offset printing and providing a new added value so as to expand a digital print system market. There have been developed a technique for detecting an area on which a clear toner is placed in order to specify a clear toner area at the time of forming an image and a method for generating an area object. There have been known some techniques for preventing erroneous detection of a clear toner area.

Detecting an area that is not intended by a user may cause an area object to be generated for placing an unnecessary clear toner. This erroneous detection causes a task for remaking an area and a task for deleting an unnecessary area object. A state in which an unnecessary area object is left affects a next step such as a task for correcting an area.

Japanese Laid-open Patent Publication No. 2006-133941 discloses an image processing device that extracts a rough contour of an object in an original image, extracts a detailed contour, and determines setting conditions and detailed extracting conditions so that the extraction result falls within a predetermined error range.

However, an area in line with user's intention cannot be easily extracted.

Therefore, it is desirable to provide an apparatus for generating data, a method for generating data, and a non-transitory computer-readable medium capable of easily extracting an area in line with user's intention.

SUMMARY OF THE INVENTION

It is an object of the present invention to at least partially solve the problems in the conventional technology.

According to an aspect of the present invention, there is provided an apparatus for generating data including: a display unit that displays an area object a contour of which is extracted from an image to be processed by an image processing application; an operating unit that receives selection conditions for selecting an area object that is intended by a user out of area objects displayed by the display unit; and a contour extracting unit that extracts a contour of an area object selected based on the selection conditions received by the operating unit, wherein the display unit, when the contour extracting unit extracts a contour of a selected area object, displays the selected area object and an unselected area object in a distinguishable manner.

According to another aspect of the present invention, there is provided a method for generating data including: displaying an area object a contour of which is extracted from an image to be processed by an image processing application; receiving selection conditions for selecting an area object that is intended by a user out of displayed area objects; extracting a contour of an area object selected based on the received selection conditions; and displaying, when a contour of a selected area object is extracted, the selected area object and an unselected area object in a distinguishable manner.

According to still another aspect of the present invention, there is provided a non-transitory computer-readable medium including computer readable program codes, performed by a processor, the program codes when executed causing the processor to execute: displaying an area object a contour of which is extracted from an image to be processed by an image processing application; receiving selection conditions for selecting an area object that is intended by a user out of displayed area objects; extracting a contour of an area object selected based on the received selection conditions; and displaying, when a contour of a selected area object is extracted, the selected area object and an unselected area object in a distinguishable manner.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 18 is a chart illustrating an example of filtering parameters used for the filtering operation.

DETAILED DESCRIPTION OF THE PREFERRED EMBODIMENTS

Figure 1:
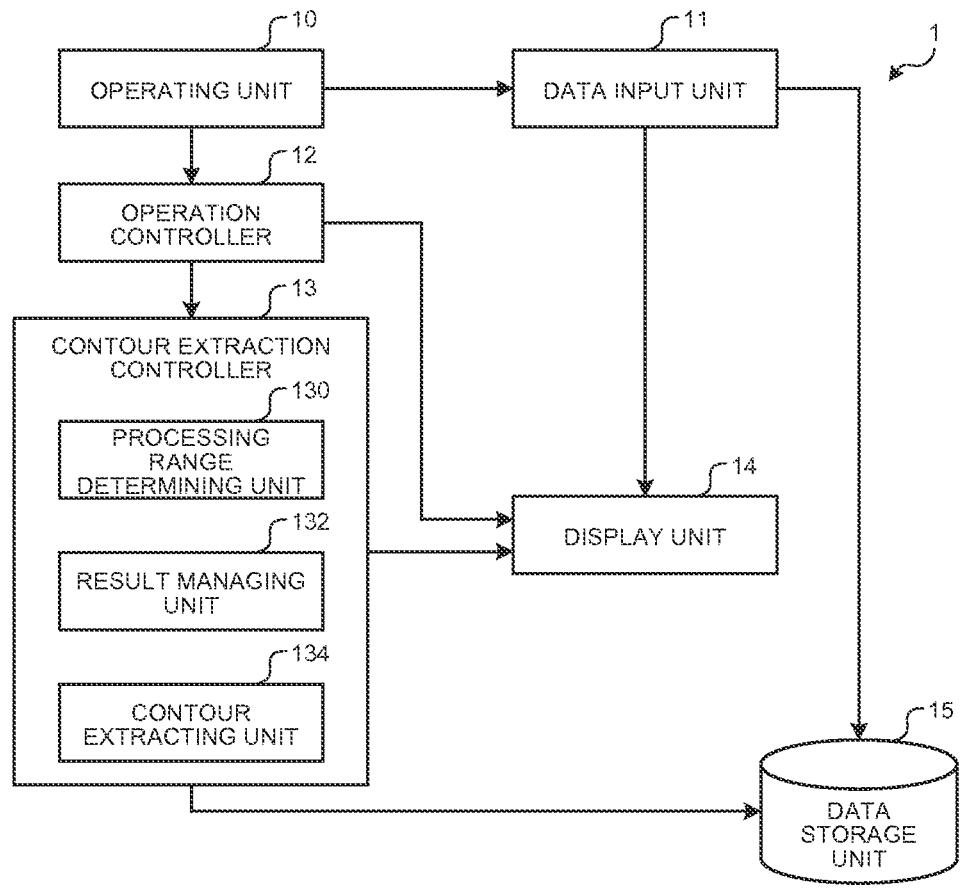
FIG. 1 is a block view illustrating an example of functions that an apparatus for generating data according to an embodiment of the present invention has.

An embodiment of an apparatus for generating data will be explained in detail with reference to accompanying drawings. FIG. 1 is a block view illustrating an example of functions that an apparatus for generating data 1 according to the embodiment of the present invention has. As illustrated in FIG. 1, the apparatus for generating data 1 includes, for example, an operating unit 10, a data input unit 11, an operation controller 12, a contour extraction controller 13, a display unit 14, and a data storage unit 15, and is capable of generating an area object on which a clear toner is placed, for example.

The operating unit 10 is an input device such as a keyboard, a mouse and the like. The data input unit 11 stores input electronic data received through the operating unit 10 in the data storage unit 15, and converts the input electronic data into data for preview display in a data format that can be handled by the display unit 14.

The operation controller 12 converts a mouse operation received by the operating unit 10 into an available event to make a notification. The operation controller 12 determines a tool based on the event received by the operating unit 10, and notifies the display unit 14.

The contour extraction controller 13 includes a processing range determining unit 130, a result managing unit 132, and a contour extracting unit 134, which will be described later, and generates an object for displaying a processing range based on a position and data received by the operation controller 12. The contour extraction controller 13 may be formed of hardware and may be formed of software. The display unit 14 is a display device such as a display apparatus. The data storage unit 15 is a storage medium such as a hard disk drive (HDD) apparatus and flash memory.

Each of the functions that the apparatus for generating data 1 has may be achieved by a computer program for generating data to be executed by a central processing unit (CPU) 106, which will be described later. The computer program for generating data may be recorded as an installable or executable file in a computer-readable recording medium such as a compact disc read-only memory (CD-ROM), a compact disc recordable (CD-R), and a digital versatile disc (DVD), and be provided as a computer program product.

Figure 2:
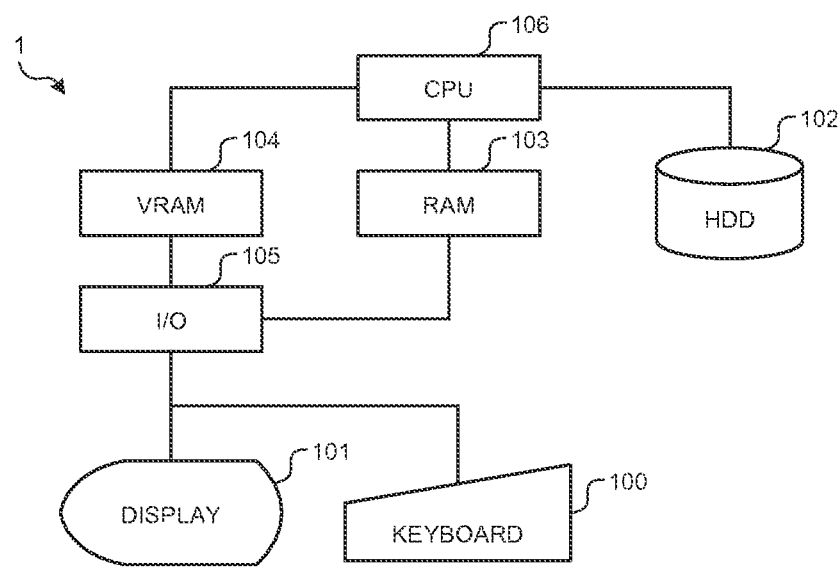
FIG. 2 is a view illustrating a hardware configuration example of the apparatus for generating data.

FIG. 2 is a view illustrating a hardware configuration example of the apparatus for generating data 1. As illustrated in FIG. 2, the apparatus for generating data 1 includes a keyboard 100, a display 101, a hard disk drive (HDD) 102, random-access memory (RAM) 103, video random-access memory (VRAM) 104, unillustrated read-only memory (ROM), an input/output (I/O) interface 105, and the CPU 106, and has the hardware configuration equipped with functions as a computer.

Figure 3:
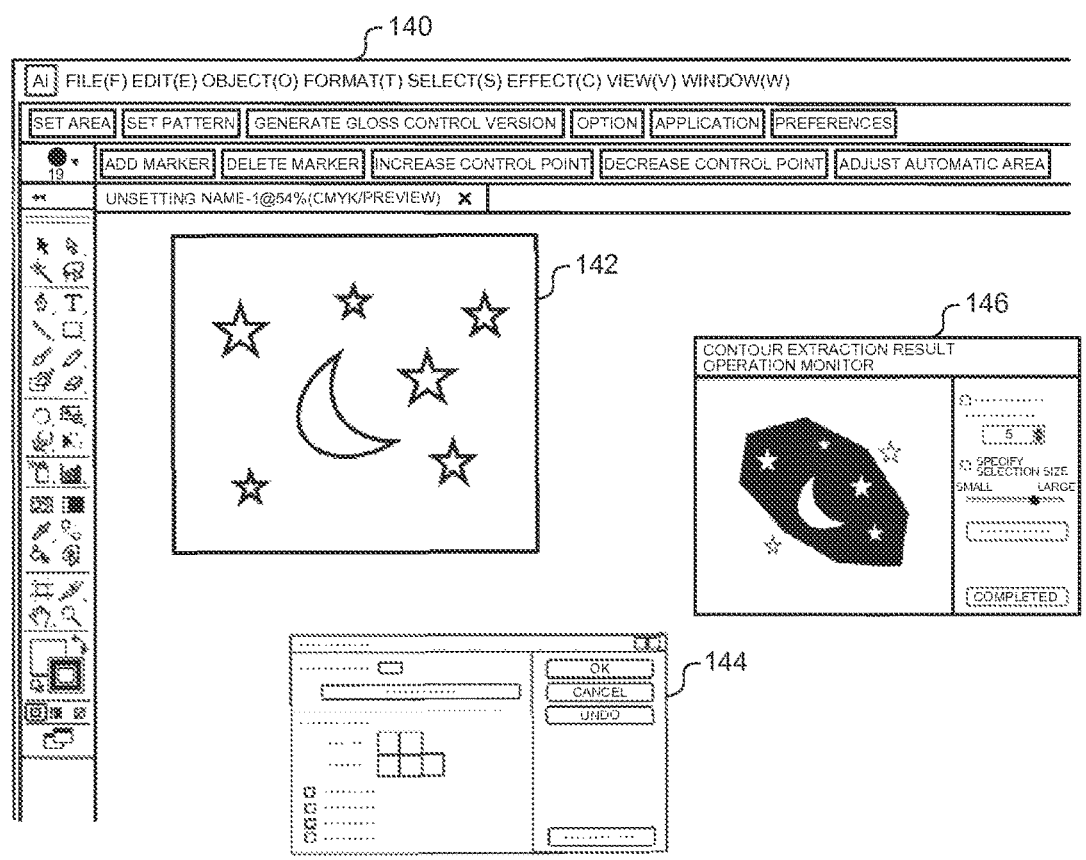
FIG. 3 is a view illustrating an example of user interfaces.

FIG. 3 is a view illustrating an example of user interfaces (UIs) displayed by the display unit 14. An application 140 is an image processing application that operates in the apparatus for generating data 1, and generates data indicating an area in line with user's intention. Examples of the application 140 include Adobe Illustrator (registered trademark).

A document 142 is an image to be processed serving as an object of data generation. A plug-in user interface (UI) 144 is used for executing contour extraction, operating correction and the like. An area extraction result operation monitor (contour extraction result operation monitor) 146 is a sub-window user interface (UI) for the plug-in UI 144 that is displayed in order to achieve a function of generating data.

Figure 4:
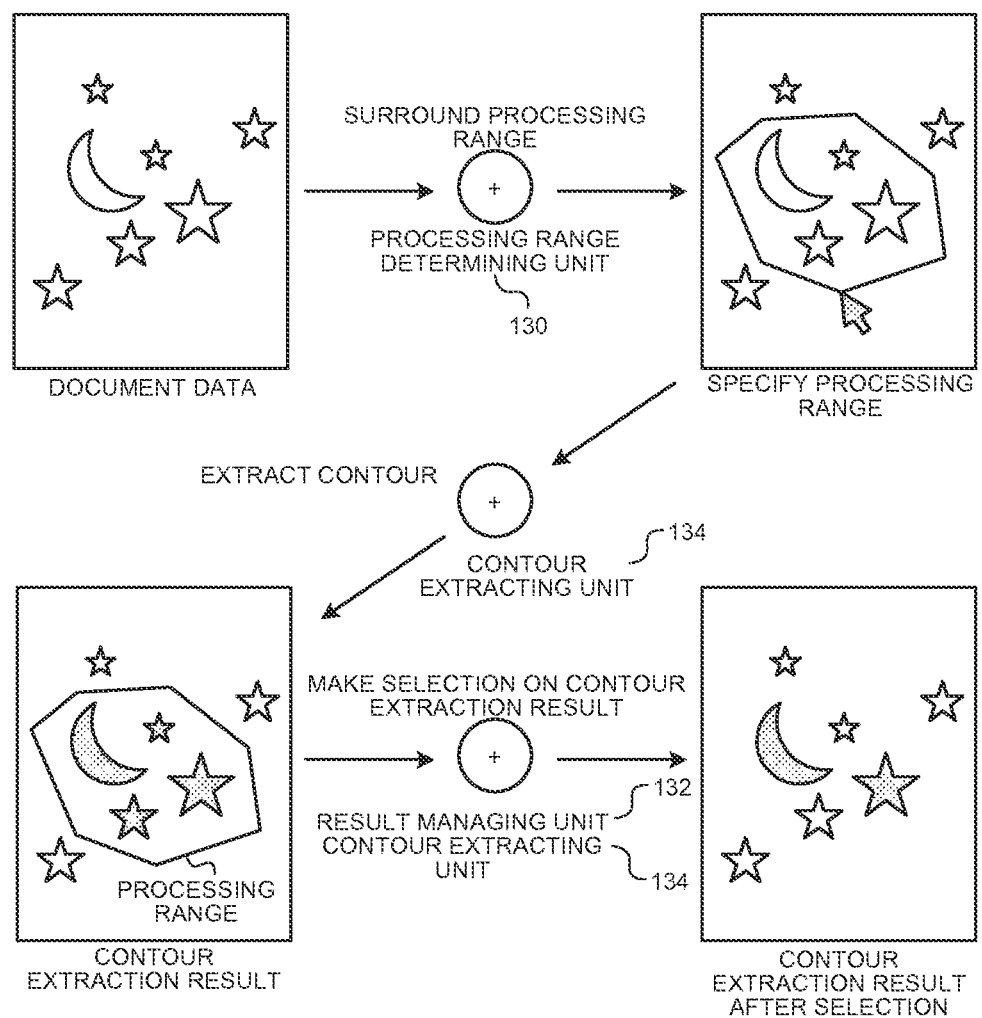
FIG. 4 is a conceptual view conceptually illustrating operation of the apparatus for generating data.

FIG. 4 is a conceptual view conceptually illustrating operation of the apparatus for generating data 1. The processing range determining unit 130 surrounds a processing range in document data corresponding to user's operation so as to determine the processing range. In other words, the processing range determining unit 130 determines a processing range that is intended by a user in an image to be processed corresponding to operation received through the operating unit 10.

The contour extracting unit 134 extracts contours of area objects selected based on selection conditions, which will be described later, in the processing range determined by the processing range determining unit 130, and causes the result managing unit 132 to manage the contour extraction result, which will be described later. The contour extracting unit 134 also extracts the contours of the selected area objects as special color objects. Examples of the special color object include an object using toners other than cyan-magenta-yellow-black (CMYK) such as a clear toner, a fluorescent toner, a silver toner, and a gold toner.

The result managing unit 132 causes the contour extracting unit 134 to make the selection on the contour extraction result. In other words, the contour extracting unit 134 makes the selection on the contour extraction result managed by the result managing unit 132 (which will be described later) corresponding to user's operation on the contour extraction result operation monitor 146. In the embodiment, any one of the selection methods (selection conditions) that are a method for specifying the number of selected objects, a method for specifying a reference size, and a method for specifying and deleting an unnecessary object on a window is specified.

More specifically, the operating unit 10 receives the selection conditions for selecting an area object that is intended by a user out of the area objects displayed by the display unit 14. Examples of the selection conditions include a condition where information indicating the number of and characteristics of area objects is set to a reference of selection, a condition where an area object smaller than that specified by a user is considered to be an unnecessary area object, and a condition where an area object specified by a user is considered to be an unnecessary area object.

Figure 5:
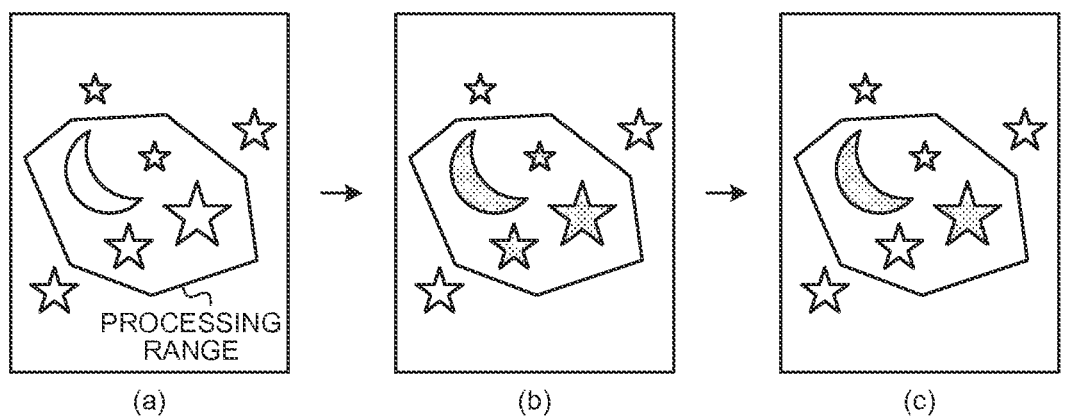
FIG. 5 is schematic view schematically illustrating operation of a case where a contour extracting unit selects area objects with the number of objects.

FIG. 5 is schematic view schematically illustrating operation in which the contour extracting unit 134 selects area objects of the contour extraction result with the number of objects. As illustrated in FIG. 5(a), the contour extracting unit 134 specifies a range from which an area is desired to be extracted as a processing range corresponding to user's operation to the processing range determining unit 130.

FIG. 5(b) illustrates a result of areas detected by the contour extracting unit 134 when the number of extracted areas is set to four. FIG. 5(c) illustrates a result of areas detected by the contour extracting unit 134 when a user sees the result illustrated in FIG. 5(b) and changes the number of areas desired to be extracted from four to two. FIG. 5(c) illustrates a result of areas (objects) preferentially detected in descending order. The contour extracting unit 134 extracts contours of area objects selected based on the selection conditions received by the operating unit 10.

Figure 6:
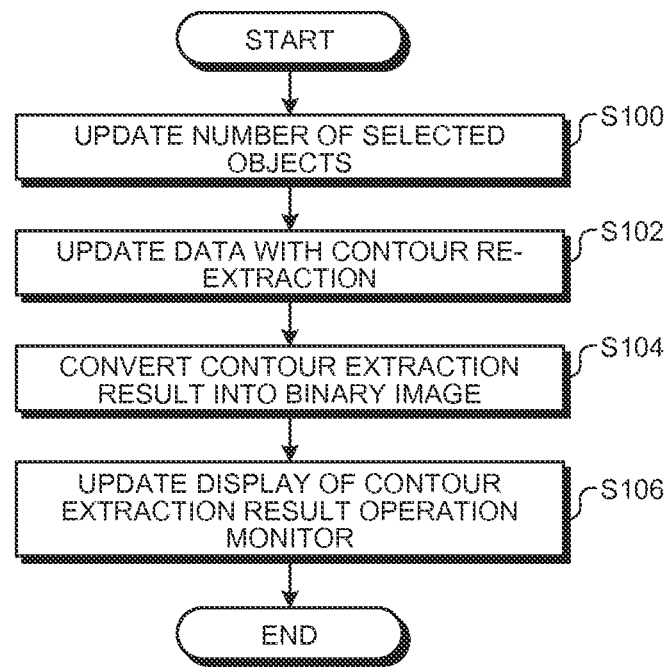
FIG. 6 is a flowchart illustrating processing performed by a result managing unit in the processing for making the selection with the number of objects.

FIG. 6 is a flowchart illustrating processing performed by the result managing unit 132 in the processing for making the selection with the number of objects. After the contour extraction result is displayed, the result managing unit 132 sets a start point at timing when a user specifies the number of selected objects through the contour extraction result operation monitor 146.

The result managing unit 132 updates the number of selected objects corresponding to the input through the contour extraction result operation monitor 146 (S100). Based on the update result, the result managing unit 132 updates graphics object data of the contour extraction result with the contour re-extraction (S102), and converts the graphics object data of the contour extraction result into a binary image (S104). The result managing unit 132 updates the processing result at S104 to the contour extraction result operation monitor 146 (S106). In other words, the result managing unit 132 updates the display of the display unit 14, updates a value of the selection size specification on the contour extraction result operation monitor 146, and ends the processing.

Figure 7:
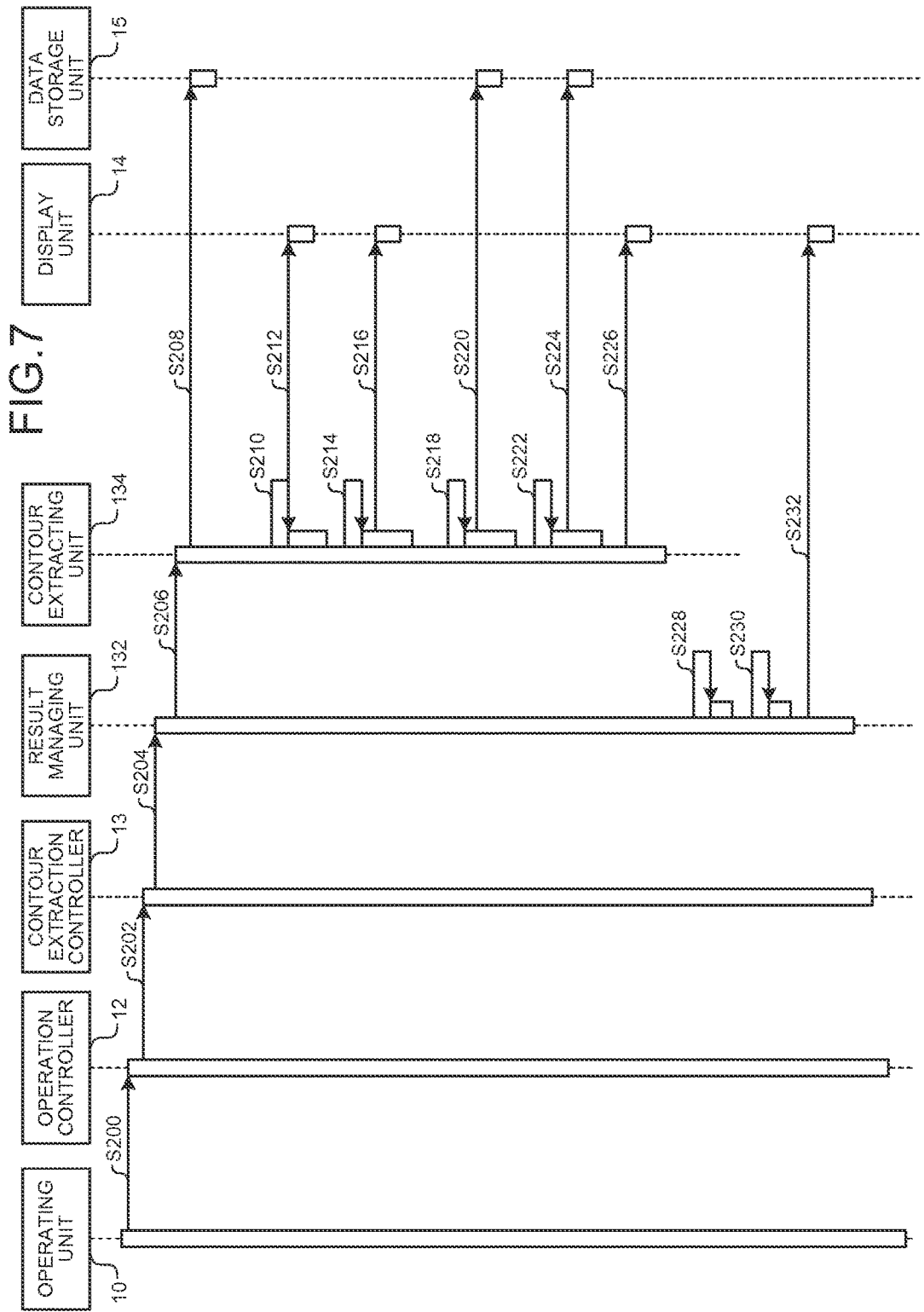
FIG. 7 is a sequence view illustrating processing in which the apparatus for generating data selects the number of area objects of the contour extraction result.

FIG. 7 is a sequence view illustrating processing in which the apparatus for generating data 1 selects the number of area objects of the contour extraction result. The operating unit 10 notifies the operation controller 12 of a user operation event (S200). The operation controller 12 notifies the contour extraction controller 13 of contour re-extraction processing (S202). The contour extraction controller 13 updates the contour extraction result managed by the result managing unit 132 (S204). The result managing unit 132 updates contour extraction data (graphics object) (S206).

The contour extracting unit 134 reads data from the data storage unit 15 (S208). The contour extracting unit 134 also reads the number of selected objects.

The contour extracting unit 134 searches an object (S210), and reads data displayed on the display unit 14 (S212). The contour extracting unit 134 performs image object rasterization (S214), and reads data displayed on the display unit 14 (S216). The contour extracting unit 134 repeats the processing from S210 to S216 for the number of objects in the processing range.

The contour extracting unit 134 extracts a contour (S218), and reads data from the data storage unit 15 (S220). The contour extracting unit 134 generates graphics objects of the contour extraction result for the number of selected objects (S222), and causes the data storage unit 15 to store therein the generated graphics objects (S224). The contour extracting unit 134 causes the updated contour object to be displayed on a document on the display unit 14 (S226). The contour extracting unit 134 causes the display unit 14 to display the updated contour object in a color different from that of the contour object before update. In other words, when the contour extracting unit 134 extracts a contour of a selected area object, the display unit 14 displays a selected area object and an unselected area object in a distinguishable manner.

The result managing unit 132 holds (S228) and converts the contour extraction result graphics object into a binary image (S230). The result managing unit 132 updates the contour extraction result operation monitor 146 displayed by the display unit 14 (S232).

Figure 8:
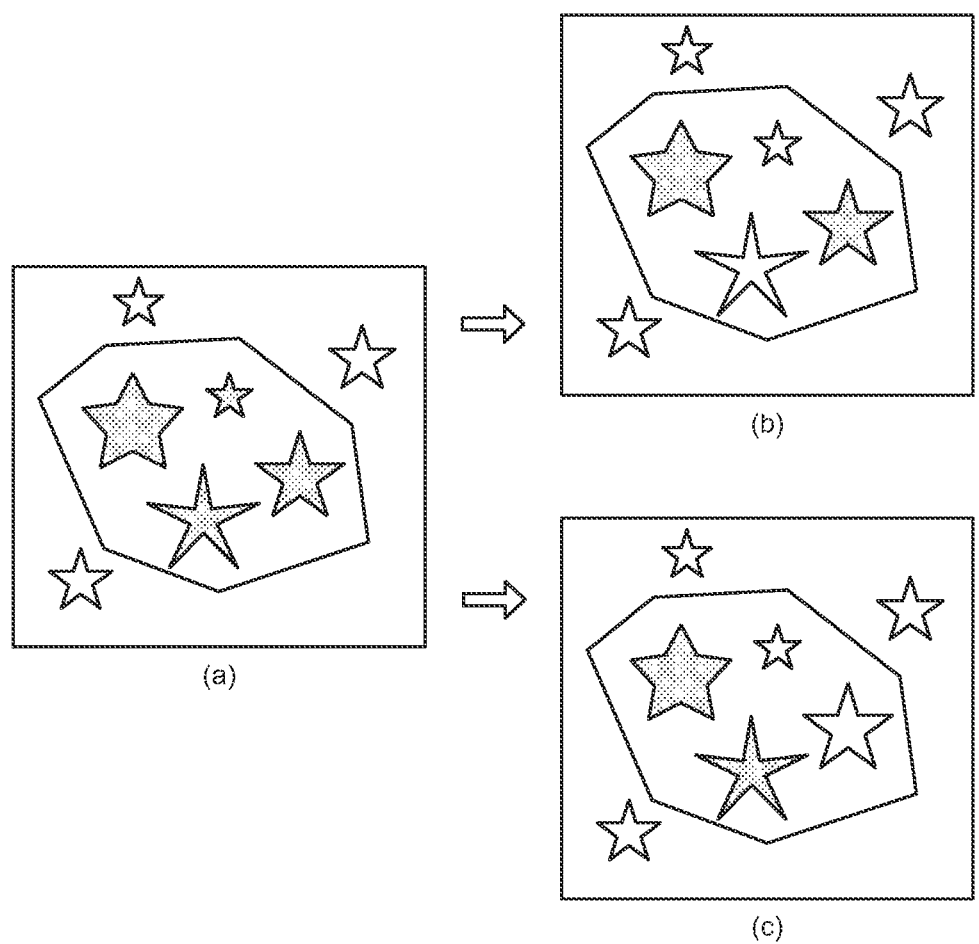
FIG. 8 is schematic view schematically illustrating filtering operation performed by the contour extracting unit when the number of area objects is changed.

FIG. 8 is schematic view schematically illustrating filtering operation performed by the contour extracting unit 134 when the number of area objects is changed. As illustrated in FIG. 8(a), the contour extracting unit 134 sets the number of areas desired to be detected to, for example, four corresponding to user's operation, selects a processing range, and detects areas.

FIGS. 8(b) and 8(c) both illustrate the case where the number of areas desired to be detected is changed to two. When a user reduces the number of areas desired to be detected, the contour extracting unit 134 filters areas corresponding to the priority of the areas to be left (see the parameters illustrated in FIG. 18) to change the number of areas.

As illustrated in FIG. 8(b), when the priority is set to the descending order of the size of area, the contour extracting unit 134 detects areas in descending order of the size of area, and displays areas that exceed the number of areas desired to be detected as deletion candidates on the display unit 14. As illustrated in FIG. 8(c), when the priority is set to the descending order of the length of periphery, the contour extracting unit 134 detects areas in descending order of the length of periphery, and displays areas that exceed the number of areas desired to be detected as deletion candidates on the display unit 14.

Figure 9:
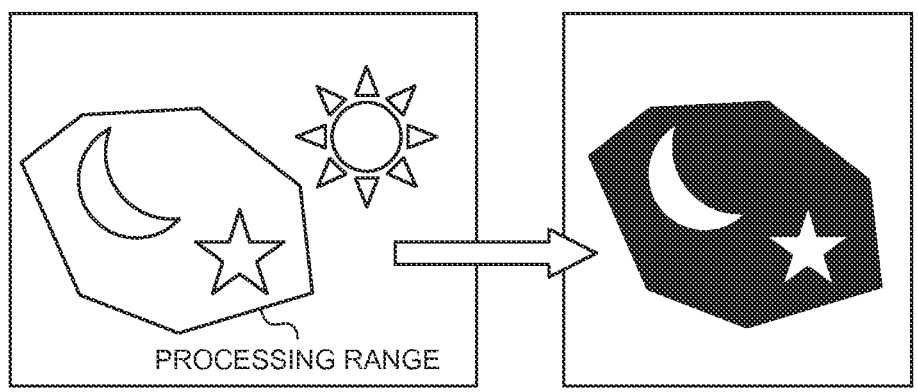
FIG. 9 is a view illustrating a modification of display performed by a contour extraction result operation monitor.

FIG. 9 is a view illustrating a modification of display performed by the contour extraction result operation monitor 146. The result managing unit 132 may specify a processing range and display the resulting area in binary images (for example, white images) on the contour extraction result operation monitor 146 as illustrated in FIG. 9. In other words, the display unit 14 displays binary images illustrating area objects selected by the contour extracting unit 134.

Figure 10:
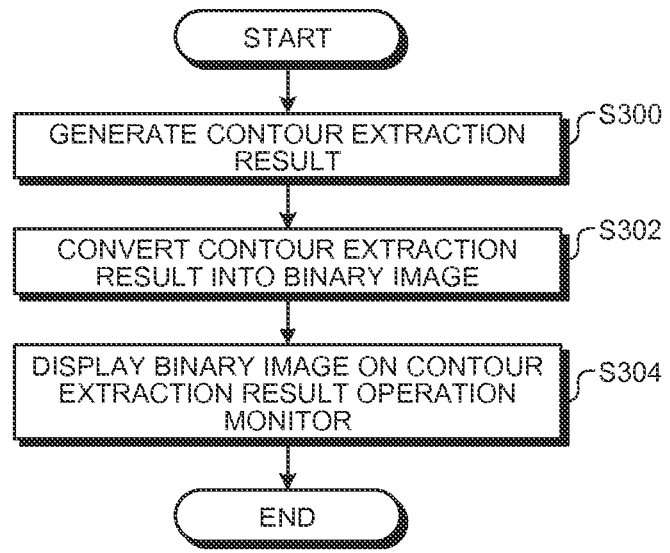
FIG. 10 is a flowchart illustrating processing performed by the result managing unit when the contour extraction result illustrated in FIG. 9 is displayed.

FIG. 10 is a flowchart illustrating processing performed by the result managing unit 132 when the contour extraction result illustrated in FIG. 9 is displayed. A start point corresponds to timing when a user selects a processing range and specifies a start of extracting a contour.

The result managing unit 132 generates a graphics object based on the contour extraction result (S300), and converts the graphics object of the contour extraction result into a binary image (S302). The result managing unit 132 causes the contour extraction result operation monitor 146 to display the converted binary image (S304).

Figure 11:
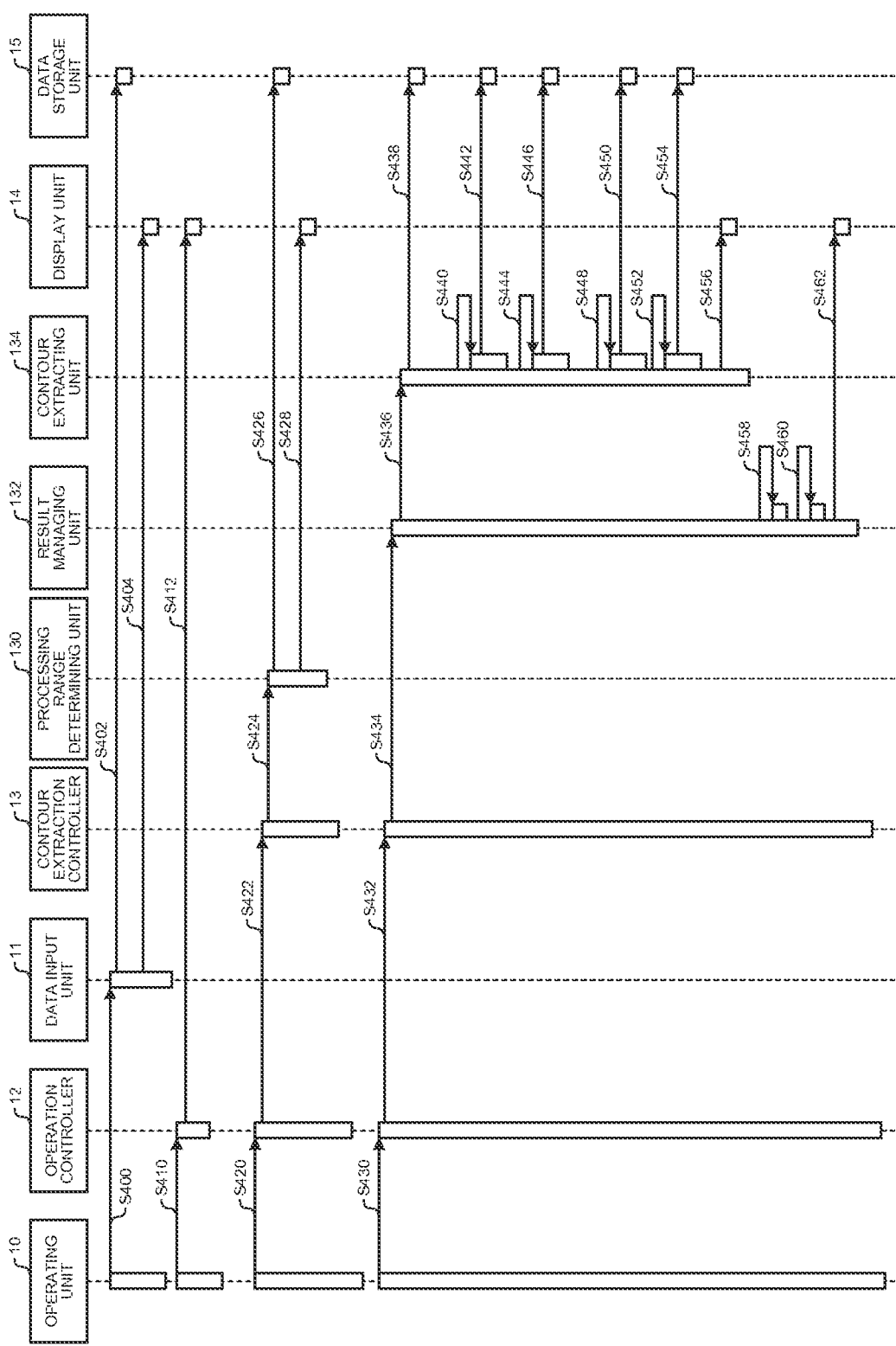
FIG. 11 is a flowchart illustrating processing performed by the apparatus for generating data when an area object of the contour extraction result is displayed.

FIG. 11 is a flowchart illustrating processing performed by the apparatus for generating data 1 when an area object of the contour extraction result is displayed. First, the operating unit 10 specifies an electronic image file to the data input unit 11 (S400). The data input unit 11 causes the data storage unit 15 to store therein the data (electronic file) (S402). The data input unit 11 causes the display unit 14 to display the image (electronic file) (S404).

Second, the operating unit 10 selects a tool to the operation controller 12 (S410). The operation controller 12 causes the display unit 14 to display a user interface (UI) of the selected tool (S412).

Third, the operating unit 10 notifies the operation controller 12 of a user operation event (S420). The operation controller 12 notifies the contour extraction controller 13 of a processing range specification (S422). The contour extraction controller 13 specifies a processing range of the processing range determining unit 130 (S424). The processing range determining unit 130 causes the data storage unit 15 to store therein data (S426). Moreover, the processing range determining unit 130 causes the display unit 14 to display a processing range (S428).

Fourth, the operating unit 10 notifies the operation controller 12 of a user operation event (S430). The operation controller 12 notifies the contour extraction controller 13 of a contour extraction processing request (S432). The contour extraction controller 13 generates a contour extraction result to the result managing unit 132 (S434). The result managing unit 132 requests the contour extracting unit 134 to generate contour extraction data (graphics object) (S436).

The contour extracting unit 134 reads data from the data storage unit 15 (S438). The contour extracting unit 134 also reads the setting of the number of extracted contours.

The contour extracting unit 134 searches an object (S440), and reads data from the data storage unit 15 (S442). The contour extracting unit 134 performs image object rasterization (S444), and reads data from the data storage unit 15 (S446). The contour extracting unit 134 repeats the processing from S440 to S446 for the number of objects in the processing range.

The contour extracting unit 134 extracts a contour (S448), and reads data from the data storage unit 15 (S450). The contour extracting unit 134 generates a graphics object of the contour extraction result (S452), and causes the data storage unit 15 to store therein the generated graphics object (S454). The contour extracting unit 134 causes the display unit 14 to display the contour object (S456).

The result managing unit 132 holds (S458) and converts the contour extraction result graphics object into a binary image (S460). The result managing unit 132 causes the display unit 14 to display the contour extraction result operation monitor 146 (S462).

Figure 12:
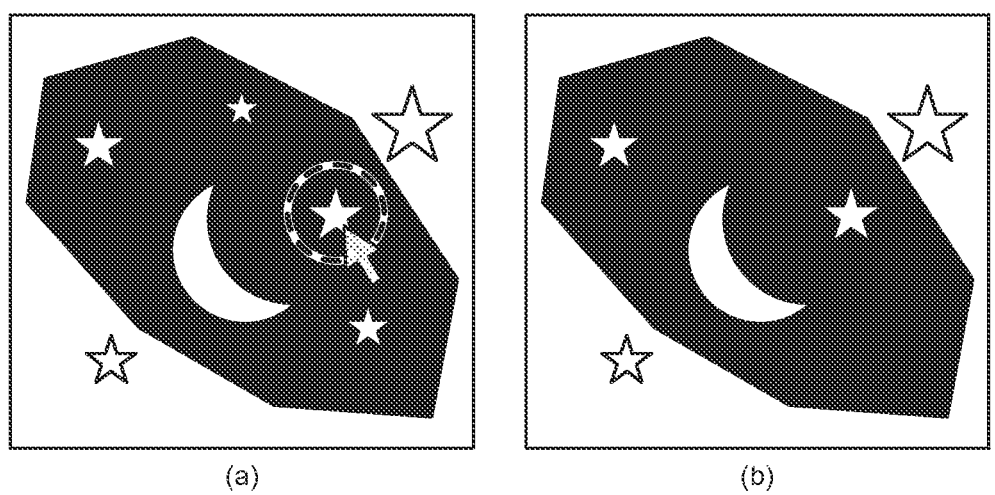
FIG. 12 is schematic view schematically illustrating processing in which the contour extracting unit selects an area object with a reference size specification.

FIGS. 12(a) and 12(b) are schematic views schematically illustrating processing in which the contour extracting unit 134 selects an area object with a reference size specification. When the contour extracting unit 134 selects an object as a reference corresponding to user's operation, such as the object indicated by a dashed line illustrated in FIG. 12(a), any objects smaller than the object in size are excluded from the contour extraction result.

Figure 13:
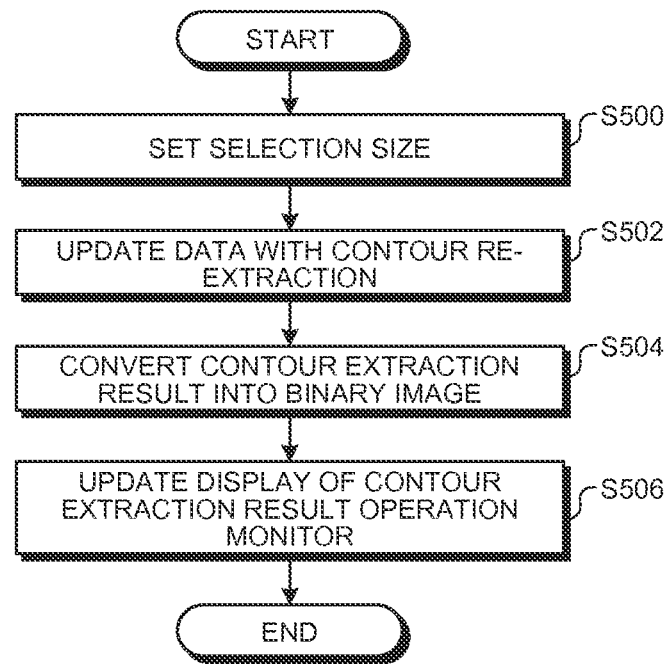
FIG. 13 is a flowchart illustrating processing performed by the result managing unit when an area object is selected with the reference size specification.

FIG. 13 is a flowchart illustrating processing performed by the result managing unit 132 when an area object is selected with the reference size specification. The result managing unit 132 causes the display unit 14 to display the contour extraction result and sets a start point at timing when a user specifies a selection size of an object through the contour extraction result operation monitor 146.

The result managing unit 132 sets an object input on the contour extraction result operation monitor 146 to a reference size so as to set a selection size (S500). Based on the set selection size, the result managing unit 132 updates graphics object data of the contour extraction result with contour re-extraction (S502), and converts the graphics object data of the contour extraction result into a binary image (S504). The result managing unit 132 updates the processing result at S504 to the contour extraction result operation monitor 146 (S506). In other words, the result managing unit 132 updates the display of the display unit 14, updates a specification value of the selected number on the contour extraction result operation monitor 146, and ends the processing.

Figure 14:
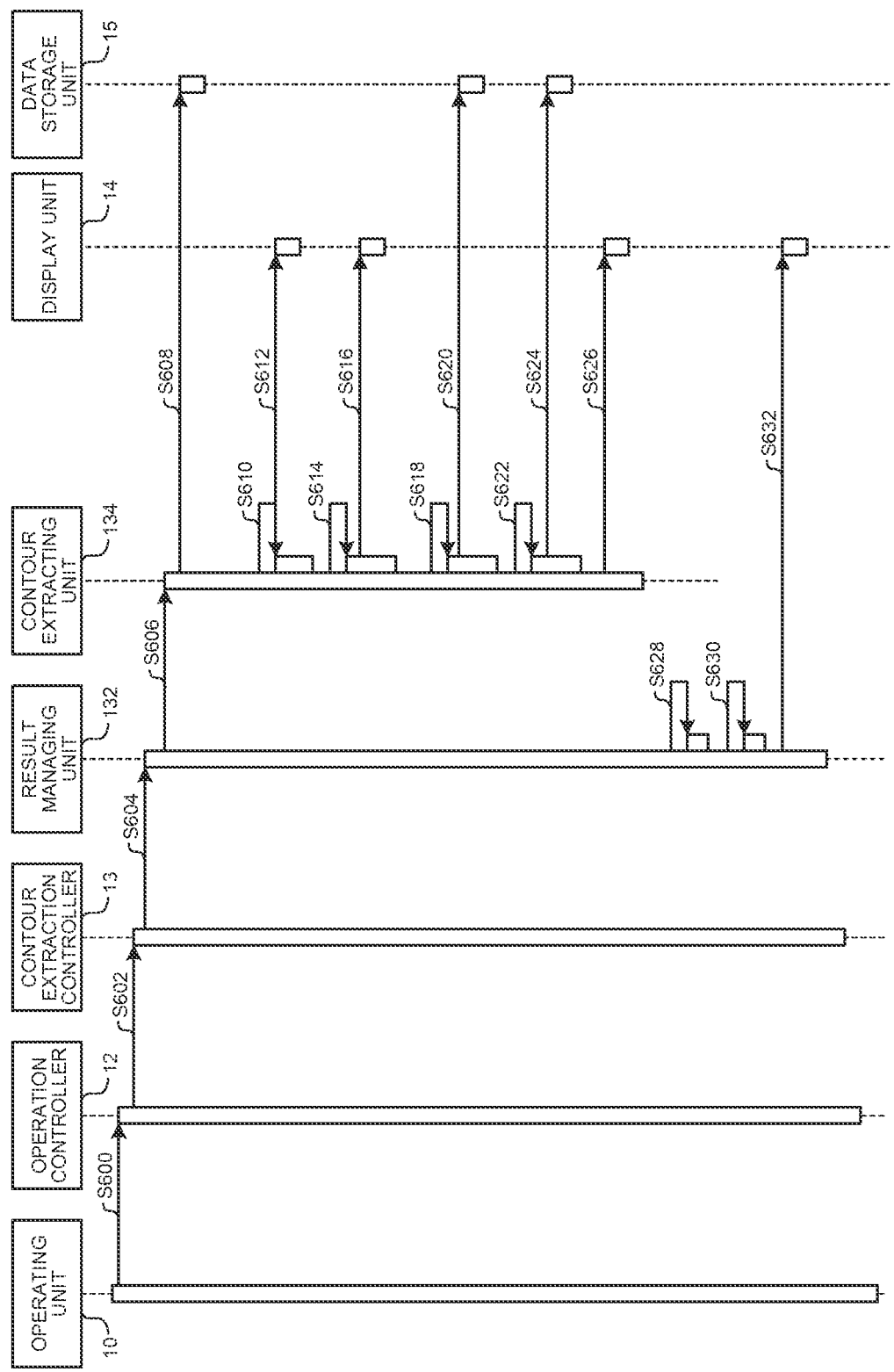
FIG. 14 is a sequence view illustrating processing in which the apparatus for generating data selects an area object with the reference size specification.

FIG. 14 is a sequence view illustrating processing in which the apparatus for generating data 1 selects an area object with the reference size specification. The operating unit 10 notifies the operation controller 12 of a user operation event (S600). The operation controller 12 notifies the contour extraction controller 13 of contour re-extraction processing (S602). The contour extraction controller 13 updates the contour extraction result of the result managing unit 132 (S604). The result managing unit 132 updates contour extraction data (graphics object) (S606).

The contour extracting unit 134 reads data from the data storage unit 15 (S608). The contour extracting unit 134 also reads reference size information.

The contour extracting unit 134 searches an object (S610), and reads data displayed on the display unit 14 (S612). The contour extracting unit 134 performs image object rasterization (S614), and reads data displayed on the display unit 14 (S616). The contour extracting unit 134 repeats the processing from S610 to S616 for the number of objects in the processing range.

The contour extracting unit 134 extracts a contour (S618), and reads data from the data storage unit 15 (S620). The contour extracting unit 134 generates a graphics object of the contour extraction result the size of which is a reference size or large (S622), and causes the data storage unit 15 to store therein the generated graphics object (S624). The contour extracting unit 134 causes the updated contour object to be displayed on a document on the display unit 14 (S626). The contour extracting unit 134 causes the display unit 14 to display the updated contour object in a color different from that of the contour object before update. In other words, when the contour extracting unit 134 extracts a contour of a selected area object, the display unit 14 displays the selected area and an unselected area object in a distinguishable manner.

The result managing unit 132 holds (S628) and converts the contour extraction result graphics object into a binary image (S630). The result managing unit 132 updates the contour extraction result operation monitor 146 displayed by the display unit 14 (S632).

Figure 15:
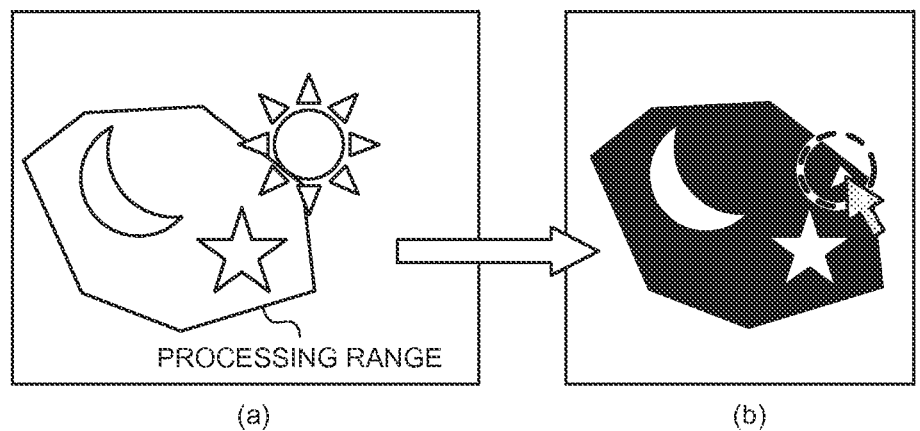
FIG. 15 is schematic view schematically illustrating operation performed by the contour extracting unit when an unnecessary area object is specified and deleted.

FIGS. 15(a) and 15(b) are schematic views schematically illustrating operation performed by the contour extracting unit 134 when an unnecessary area object is specified and deleted. On a dialogue where the area extraction result illustrated in FIG. 15(b) is displayed in a binary image with respect to the processing range illustrated in FIG. 15(a), the contour extracting unit 134 selects and deletes an unnecessary area, for example, an object in a dashed line corresponding to user's operation.

Figure 16:
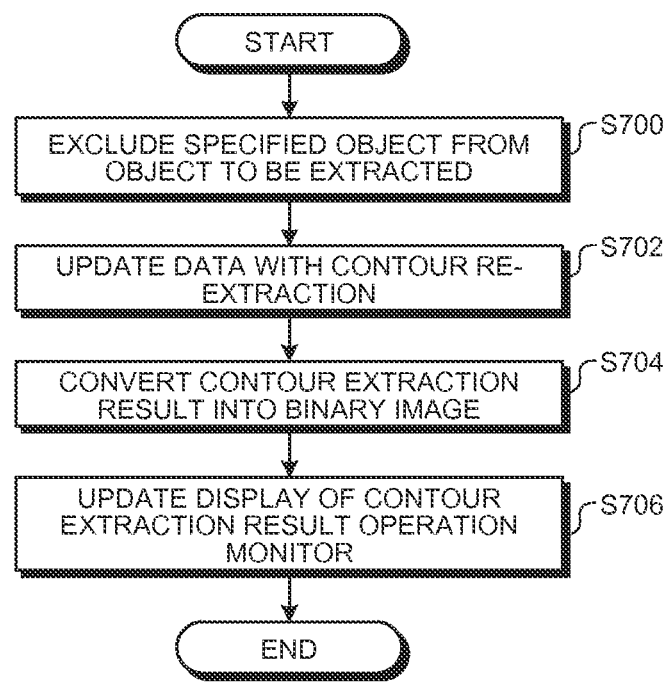
FIG. 16 is a flowchart illustrating an outline of processing performed by the result managing unit and the contour extracting unit when an unnecessary area object is specified and deleted.

FIG. 16 is a flowchart illustrating an outline of processing performed by the result managing unit 132 and the contour extracting unit 134 when an unnecessary area object is specified and deleted. The result managing unit 132 causes the display unit 14 to display the contour extraction result, and sets a start point at timing when a user specifies an area object to be deleted as an unnecessary object through the contour extraction result operation monitor 146.

The contour extracting unit 134 excludes an area object specified on the contour extraction result operation monitor 146 from a target object (S700), and re-extracts a contour to update graphics object data of the contour extraction result (S702). The result managing unit 132 converts the graphics object data of the contour extraction result into a binary image (S704) based on the processing result at S702, and updates the converted result to the contour extraction result operation monitor 146 (S706). In other words, the result managing unit 132 updates the display of the display unit 14, updates the specification of the selected number and the selection size on the contour extraction result operation monitor 146, and ends the processing.

Figure 17:
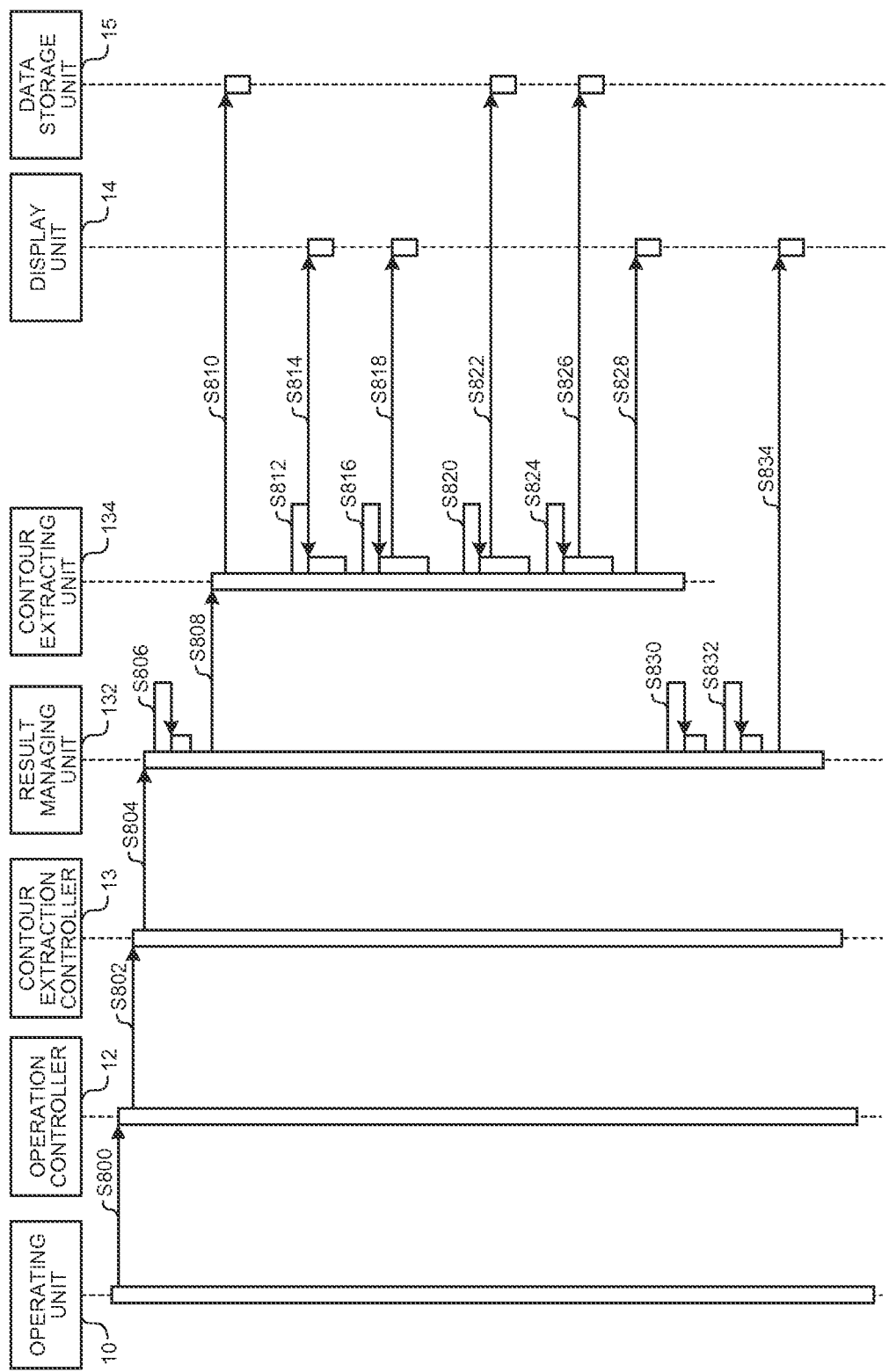
FIG. 17 is a sequence view illustrating processing in which the apparatus for generating data specifies and deletes an unnecessary area object.

FIG. 17 is a sequence view illustrating processing in which the apparatus for generating data 1 specifies and deletes an unnecessary area object. The operating unit 10 notifies the operation controller 12 of a user operation event (S800). The operation controller 12 notifies the contour extraction controller 13 of contour re-extraction processing (S802). The contour extraction controller 13 updates the contour extraction result of the result managing unit 132 (S804). The result managing unit 132 sets an object to be deleted (S806). The result managing unit 132 updates contour extraction data (graphics object) (S808).

The contour extracting unit 134 reads data from the data storage unit 15 (S810). The contour extracting unit 134 searches an object (S812), and reads data displayed on the display unit 14 (S814). The contour extracting unit 134 performs image object rasterization (S816), and reads data displayed on the display unit 14 (S818). The contour extracting unit 134 repeats the processing from S812 to S818 for the number of objects in the processing range.

The contour extracting unit 134 extracts a contour (S820), and reads data from the data storage unit 15 (S822). The contour extracting unit 134 generates a graphics object of the contour extraction result other than an object to be deleted (S824), and causes the data storage unit 15 to store therein the generated graphics object (S826). The contour extracting unit 134 causes the updated contour object to be displayed on a document on the display unit 14 (S828). The contour extracting unit 134 causes the display unit 14 to display the updated contour object in a color different from that of the contour object before update. In other words, when the contour extracting unit 134 extracts a contour of a selected area object, the display unit 14 displays the selected area object and an unselected area object in a distinguishable manner.

The result managing unit 132 holds (S830) and converts the contour extraction result graphics object into a binary image (S832). The result managing unit 132 updates the contour extraction result operation monitor 146 displayed by the display unit 14 (S834).

FIG. 18 is a chart illustrating an example of filtering parameters used for the filtering operation when the contour extracting unit 134 makes the selection corresponding to the number of selected area objects. As described above, when making the selection corresponding to the number of selected area objects, the apparatus for generating data 1 can make the selection corresponding to characteristics of an area (such as a size of an area and a periphery length of an area). The apparatus for generating data 1 makes the selection based on the size of an area, for example, by comparing the area parameter of each object.

In this manner, the apparatus for generating data 1 selects a processing range so as to select an area object using each of the following methods and improve task efficiency of a user.

First, the apparatus for generating data 1 displays an area extraction result as a candidate value, and compares characteristics of areas (such as a size of an area and a periphery length of an area) based on the number of selected area objects so as to select an area object. The apparatus for generating data 1 displays the selected result together with an unselected area object, and re-selects an area object.

Second, the apparatus for generating data 1 displays a monitor (binary image) capable of checking where an area object is generated, and enables a user to visually check and select the area object.

Third, the apparatus for generating data 1 can select only an area object the size of which is a reference size or larger.

Fourth, the apparatus for generating data 1 can exclude a selected object from a result while checking one monitor.

The present embodiment enables an area in line with user's intention to be easily extracted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for generating data comprising:
 a display unit that displays plural area objects, for each of which, a contour thereof is extracted from an image to be processed by an image processing application;
 an operating unit that receives selection conditions for selecting an area object that is intended by a user out of the plural area objects displayed by the display unit; and
 a contour extracting unit that extracts, as a contour extraction result, a contour of the area object selected based on the selection conditions received by the operating unit, wherein
 the display unit, when the contour extracting unit extracts the contour extraction result representing the contour of the selected area object, displays the contour extraction result and displays the selected area object and an unselected area object in a distinguishable manner, and
 wherein when, amongst the selection conditions, a selection condition in which already-displayed area objects that are smaller than a user-specified area object are to be processed as unnecessary area objects is received through the operating unit, the display unit and the contour extraction result are updated to exclude the unnecessary area objects smaller than the user-specified area object.

2. The apparatus for generating data according to claim 1, further comprising:
 a processing range determining unit that determines a processing range that is intended by the user in the image to be processed responsive to operation received through the operating unit, wherein
 the contour extracting unit extracts the contour of the area object selected based on the selection conditions in the processing range determined by the processing range determining unit.

3. The apparatus for generating data according to claim 1, wherein the contour extracting unit extracts the contour of the selected area object as a special color object.

4. The apparatus for generating data according to claim 1, wherein the display unit displays a binary image illustrating the area object selected by the contour extracting unit.

5. The apparatus for generating data according to claim 1, wherein the operating unit receives a selection condition in which an area object specified by the user is considered as an unnecessary area object.

6. The apparatus for generating data according to claim 1, wherein the operating unit receives a selection condition in which information indicating number of and characteristics of area objects is considered to be a reference of selection.

7. A method for generating data comprising:
 (a) displaying, on a display unit, plural area objects, for each of which, a contour thereof is extracted from an image to be processed by an image processing application;
 (b) receiving selection conditions for selecting an area object that is intended by a user out of the plural displayed area objects displayed on the display unit;

(c) extracting, as a contour extraction result, a contour of the area object selected based on the received selection conditions; and (d) displaying on the display unit, when the contour extraction result representing the contour of the selected area object is extracted, the selected area object and an unselected area object in a distinguishable manner, wherein when the selection conditions received in (b) include selection of a specified number of area objects to be selected, a number of area objects included in the contour extraction result extracted in (c) and a number of selected area objects displayed in (d) are limited to no more than the specified number of area objects.

8. A non-transitory computer-readable medium comprising computer readable program codes, performed by a processor, the program codes when executed causing the processor to execute:

(a) displaying, on a display unit, plural area objects, for each of which, a contour thereof is extracted from an image to be processed by an image processing application;

(b) receiving selection conditions for selecting an area object that is intended by a user out of the plural displayed area objects;

(c) extracting, as a contour extraction result, a contour of the area object selected based on the received selection conditions; and (d) displaying on a display unit, when the contour extraction result representing the contour of the selected area object is extracted, the selected area object and an unselected area object in a distinguishable manner, wherein when the selection conditions received in (b) include selection of a specified number of area objects to be selected, a number of area objects included in the contour extraction result extracted in (c) and a number of selected area objects displayed in (d) are limited to no more than the specified number of area objects.

* * * * *